Aug. 9, 1938.   C. V. EAST   2,126,457

TREE DECORATING APPLIANCE

Filed April 29, 1937

Inventor
C. V. East

Patented Aug. 9, 1938

2,126,457

UNITED STATES PATENT OFFICE 2,126,457

TREE DECORATING APPLIANCE

Claude V. East, Milwaukee, Wis.

Application April 29, 1937, Serial No. 139,782

1 Claim. (Cl. 248—40)

This invention appertains to tree decorating appliances, and more particularly to means whereby loose branches can be quickly and conveniently connected to the trunk of a Christmas tree to fill up bare spaces in the foliage of the tree, and thereby produce a symmetrical tree which will be attractive and pleasing to the eye.

One of the salient objects of my invention is the provision of a socket for receiving loose branches of different diameters, with means for firmly clamping the selected branch in the socket, and a screw associated with the socket for threaded connection with the trunk of the tree at the desired point.

Another important object of my invention is the provision of means whereby the inner end of the socket will readily follow the screw into the tree trunk, and partially embed itself therein, so that the socket will be effectively supported by the tree trunk, and be prevented from tilting thereon under the weight of the branch being supported.

A further object of my invention is to provide a novel means for connecting loose branches to the trunk of an evergreen tree, which will be durable and efficient in use, one that will be simple and easy to manufacture, and one which can be placed upon the market at a reasonable cost.

With these and other objects in view, the invention consists in the novel construction, arrangement, and formation of parts, as will be hereinafter more specifically described, claimed, and illustrated in the accompanying drawing, in which drawing:

Referring to the drawing in detail, wherein similar reference characters designate corresponding parts throughout the several views, the letter A generally indicates my improved appliance for connecting a loose branch B with an evergreen tree T.

Figure 1:
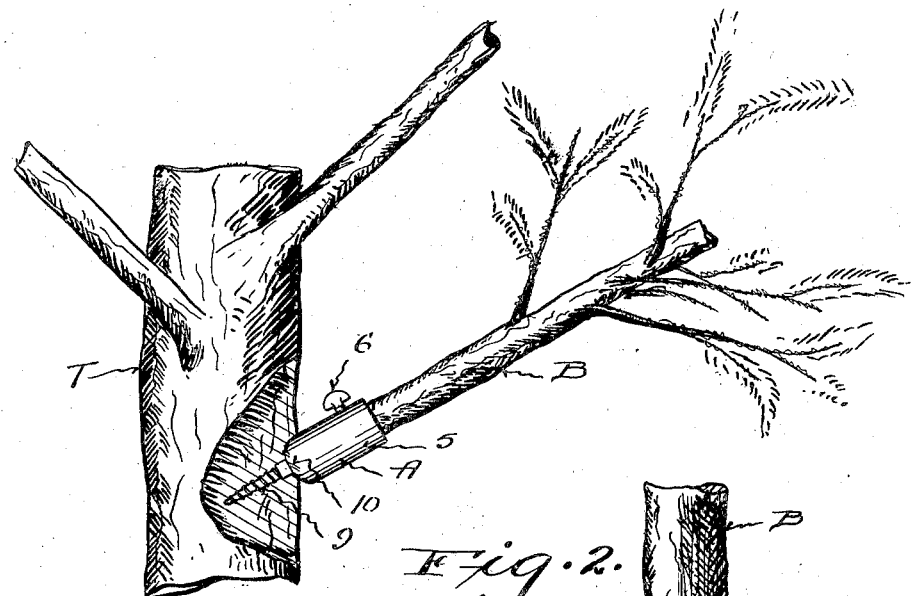
Figure 1 is a side elevation of one of my improved tree decorating appliances, showing the same in use, only a fragment of the tree trunk and the branch being connected being shown, a portion of the tree trunk being broken away and in section.
Figure 2:
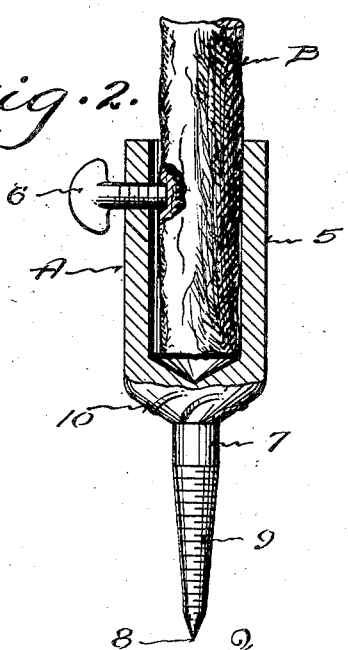
Figure 2 is an enlarged longitudinal sectional view through one of the appliances, showing a branch being held therein.
Figure 3:
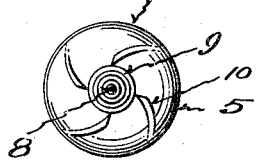
Figure 3 is an inner end elevation of one of my improved appliances.

My improved appliance embodies a rigid socket member 5, in which the inner end of the branch B can be inserted. The interior diameter of the socket 5 is such that branches of different diameters can be readily accommodated therein. In order to hold the branch tightly in the socket, one wall of the socket carries an adjustable thumb screw 6, and this screw can be turned so that the same will tightly impinge against the branch so that all loose play of the branch in the socket will be eliminated.

Carried by the inner end of the socket is an elongated shank 7, which gradually tapers toward its inner or free end to a penetrating point 8. The shank is threaded throughout its length, as at 9, to form a relatively large wood screw. Obviously, the socket 5 forms a handle, and permits the screw to be inserted in the trunk of a tree, and be readily turned until the screw feeds its way into the trunk.

The inner end of the socket 5, around the shank 7, is tapered toward the shank, and has formed thereon spiral cutting edges or screw threads 10. This forms an important feature of my invention, for when the screw has been fed into the trunk, the socket will engage the trunk, and the spiral cutting edges or threads 10 will likewise cut into the trunk, and the socket will partially embed itself therein. This will form an effective support for the socket, and prevent the tilting of the socket on the tree trunk under the weight of the branch being held.

Many evergreen trees, which are used during the Christmas season, have bare spaces in the foliage thereof, and by using one or more of my appliances these bare spaces can be filled up with loose branches which have been discarded.

Changes in details may be made without departing from the spirit or the scope of my invention, but what I claim as new is:

An appliance for attaching loose branches to the trunk of a tree comprising an elongated socket for receiving the inner end of a branch to be held, means for clamping the branch in the socket, and an elongated tapered threaded shank on the inner end of the socket for insertion in the tree trunk, said socket having its inner end tapering toward the shank, and spiral cutting blades on the tapered end of the socket.

CLAUDE V. EAST.